(12) United States Patent
Shiepe et al.

(10) Patent No.: US 6,682,845 B2
(45) Date of Patent: Jan. 27, 2004

(54) APPARATUS FOR MAINTAINING COMPRESSION OF THE ACTIVE AREA IN AN ELECTROCHEMICAL CELL

(75) Inventors: Jason K. Shiepe, Middletown, CT (US); Greg A. Hanlon, East Hampton, CT (US)

(73) Assignee: Proton Energy Systems, Inc., Rocky Hill, CT (US)

( * ) Notice: Subject to any disclaimer, the term of this patent is extended or adjusted under 35 U.S.C. 154(b) by 108 days.

(21) Appl. No.: 09/965,680

(22) Filed: Sep. 27, 2001

(65) Prior Publication Data

US 2003/0104264 A1 Jun. 5, 2003

Related U.S. Application Data

(60) Provisional application No. 60/235,757, filed on Sep. 27, 2000.

(51) Int. Cl.[7] .................................... H01M 8/02
(52) U.S. Cl. ................................. 429/37; 429/66
(58) Field of Search ....................... 429/13, 34, 30, 429/37, 66; 204/252; 29/623.1

(56) References Cited

U.S. PATENT DOCUMENTS

| 4,011,360 A | 3/1977 | Walsh ................... 428/402 |
| 4,225,654 A | 9/1980 | Tajima et al. ............ 429/34 |
| 4,317,864 A | 3/1982 | Strasser .................. 429/36 |
| 4,732,660 A | 3/1988 | Plowman et al. ........ 204/265 |
| 4,844,992 A | 7/1989 | Strasser .................. 429/34 |
| 4,912,286 A | 3/1990 | Clarke |

(List continued on next page.)

FOREIGN PATENT DOCUMENTS

| DE | 200 08 539 | * 8/2000 |
| GB | 966407 | 8/1964 |
| JP | 58164170 | 9/1983 |
| JP | 2160371 | 6/1990 |
| JP | 5101836 | 4/1993 |
| JP | 5166523 | 7/1993 |

(List continued on next page.)

OTHER PUBLICATIONS

T.G. Coker, et al.—"Industrial and Government Applications of SPE Fuel Cell and Electrolyzers", The Case western Symposium, May 17–19, 1982, Cleveland, Ohio. 23 pages.
English Translation of JP 10162842 Abstract Only (Japan), 1 page.
English Translation of JP 02160371 Abstract Only (Japan), 1 page.
English Translation of JP 05166523 Abstract Only (Japan), 1 page.
English Translation of JP 58164170 Abstract Only (Japan), 1 page.
English Translation of JP 05101836 Abstract Only (Japan), 1 page.
International Search Report, International Application No. PCT/US01/30207; International Filing Date: Sep. 27, 2001, 7 pages.
International Search Report, International Application No. PCT/US01/30251; International Filing Date: Sep. 27, 2001.
"Conductive Ceramic Technology", The Ebonix Company, http://www.netcontex.com/atraverda/index.htm; Jan. 15, 2002, 11 pages.

*Primary Examiner*—Stephen Kalafut
*Assistant Examiner*—Gregg Cantelmo
(74) *Attorney, Agent, or Firm*—Cantor Colburn LLP

(57) ABSTRACT

A unitary, porous, electrically conductive pressure pad is employed in an electrochemical cell stack. The pressure pad includes integral mixture of electrically conductive material and polymeric material, generally formed of materials compatible with the electrochemical cell. The electrically conductive pressure pad is preferably in at least in partial fluid communication with the first electrode, the second electrode, or both the first and second electrodes.

13 Claims, 4 Drawing Sheets

U.S. PATENT DOCUMENTS

| | | | |
|---|---|---|---|
| 5,009,968 A | 4/1991 | Guthrie et al. | 429/26 |
| 5,082,596 A | 1/1992 | Fukuda et al. | 252/511 |
| 5,281,496 A | 1/1994 | Clarke | |
| 5,296,570 A | 3/1994 | Earls et al. | 525/481 |
| 5,324,565 A | 6/1994 | Leonida et al. | 428/131 |
| 5,366,823 A | 11/1994 | Leonida et al. | 429/34 |
| 5,466,354 A | 11/1995 | Leonida et al. | 304/252 |
| 5,472,801 A | 12/1995 | Mattejat et al. | 429/39 |
| 5,547,777 A | 8/1996 | Richards | 429/32 |
| 5,580,672 A | 12/1996 | Zagala, III et al. | 204/265 |
| 5,585,038 A | 12/1996 | Kirmanen | 252/500 |
| 5,656,690 A | 8/1997 | Pradl et al. | 524/847 |
| 5,824,199 A | 10/1998 | Simmons et al. | 204/265 |
| 6,096,450 A | 8/2000 | Walsh | 429/34 |
| 6,171,719 B1 | 1/2001 | Roy et al. | 429/39 |
| 2002/0022173 A1 | 2/2002 | Molter et al. | 429/37 |

FOREIGN PATENT DOCUMENTS

| | | |
|---|---|---|
| WO | WO 98/23794 | 6/1998 |
| WO | WO 98/40537 | 9/1998 |
| WO | WO 98/57384 | 12/1998 |
| WO | WO 99/27599 | 6/1999 |
| WO | WO 00/39362 | 7/2000 |
| WO | WO 02/50339 A1 | 6/2002 |

\* cited by examiner

APPARATUS FOR MAINTAINING COMPRESSION OF THE ACTIVE AREA IN AN ELECTROCHEMICAL CELL

CROSS-REFERENCE TO RELATED APPLICATIONS

This application claims priority to U.S. application Ser. No. 60/235,757, filed Sep. 27, 2000, which is fully incorporated herein by reference.

BACKGROUND

The present invention relates to a method and apparatus for maintaining compression within the active area of an electrochemical cell.

Electrochemical cells are energy conversion devices, usually classified as either electrolysis cells or fuel cells. A proton exchange membrane electrolysis cell can function as a hydrogen generator by electrolytically decomposing water to produce hydrogen and oxygen gas, and can function as a fuel cell by electrochemically reacting. hydrogen with oxygen to generate electricity. Referring to FIG. 1, which is a partial section of a typical anode feed electrolysis cell 100, process water 102 is fed into cell 100 on the side of an oxygen electrode (anode) 116 to form oxygen gas 104, electrons, and hydrogen ions (protons) 106. The reaction is facilitated by the positive terminal of a power source 120 electrically connected to anode 116 and the negative terminal of power source 120 connected to a hydrogen electrode (cathode) 114. The oxygen gas 104 and a portion of the process water 108 exit cell 100, while protons 106 and water 110 migrate across a proton exchange membrane 118 to cathode 114 where hydrogen gas 112 is formed.

Another typical water electrolysis cell using the same configuration as is shown in FIG. 1 is a cathode feed cell, wherein process water is fed on the side of the hydrogen electrode. A portion of the water migrates from the cathode across the membrane to the anode where hydrogen ions and oxygen gas are formed due to the reaction facilitated by connection with a power source across the anode and cathode. A portion of the process water exits the cell at the cathode side without passing through the membrane.

A typical fuel cell uses the same general configuration as is shown in FIG. 1. Hydrogen gas is introduced to the hydrogen electrode (the anode in fuel cells), while oxygen, or an oxygen-containing gas such as air, is introduced to the oxygen electrode (the cathode in fuel cells). Water can also be introduced with the feed gas. The hydrogen gas for fuel cell operation can originate from a pure hydrogen source, hydrocarbon, methanol, or any other hydrogen source that supplies hydrogen at a purity suitable for fuel cell operation (i.e., a purity that does not poison the catatlyst or interfere with cell operation). Hydrogen gas electrochemically reacts at the anode to produce protons and electrons, wherein the electrons flow from the anode through an electrically connected external load, and the protons migrate through the membrane to the cathode. At the cathode, the protons and electrons react with oxygen to form water, which additionally includes any feed water that is dragged through the membrane to the cathode. The electrical potential across the anode and the cathode can be exploited to power an external load.

In other embodiments, one or more electrochemical cells can be used within a system to both electrolyze water to produce hydrogen and oxygen, and to produce electricity by converting hydrogen and oxygen back into water as needed. Such systems are commonly referred to as regenerative fuel cell systems.

Electrochemical cell systems typically include one or more individual cells arranged in a stack, with the working fluids directed through the cells via input and output conduits formed within the stack structure. The cells within the stack are sequentially arranged, each including a cathode, a proton exchange membrane, and an anode (hereinafter "membrane electrode assembly", or "MEA"). Each cell typically further comprises a first flow field in fluid communication with the cathode and a second flow field in fluid communication with the anode. The MEA may be supported on either or both sides by screen packs or bipolar plates disposed within the flow fields, and which may be configured to facilitate membrane hydration and/or fluid movement to and from the MEA.

In order to maintain intimate contact between cell components under a variety of operational conditions and over long time periods, uniform compression is applied to the cell components. Pressure pads or other compression means are often employed to provide even compressive force from within the electrochemical cell. Some pressure pads are fabricated from materials incompatible with system fluids and/or the cell membrane, thereby requiring the pressure pads to be disposed within a protective encasing or otherwise isolated from the system fluids.

Even in the absence of a protective casing or a separator plate, it nonetheless remains difficult to manufacture pressure pad that provide even compression, especially at high pressures, for example greater than about 150 pounds per square inch (psi). There accordingly remains a need in the art for an improved pressure pad that maintains uniform compression, can be utilized for extended periods at high pressures, and that is compatible with the electrochemical cell environment.

SUMMARY OF THE INVENTION

The above-described drawbacks and disadvantages are overcome by an electrochemical cell comprising a first electrode; a second electrode; a membrane disposed between said first and second electrodes; and a unitary, electrically conductive pressure pad disposed adjacent to the first or second electrode, wherein the pressure pad comprises an integral blend of electrically conductive material and polymeric material. In a preferred embodiment, the pressure pad is formed of materials compatible with the electrochemical cell environment and is in at least partial fluid communication with the first or second electrode.

The above discussed and other features and advantages will be appreciated and understood by those skilled in the art from the following detailed description and drawings.

DESCRIPTION OF THE DRAWINGS

Referring now to the drawings, which are meant to be exemplary and not limiting.

DETAILED DESCRIPTION OF THE PREFERRED EMBODIMENTS

Novel unitary, electrically conductive pressure pads for maintaining compression of the active area in an electrochemical cell are in the form of a single, porous sheet comprising an integral blend of electrically conductive material and polymeric material. These pressure pads can be utilized on sides of the cell proximate to the first electrode, the second electrode, or separately on both sides of the cell proximate to both electrodes. The pressure pads herein can be exposed to the system fluids, disposed in the flow field of the cell, or as a substitute for the conventional assembly of a pressure pad and support member.

Although the disclosure below is described in relation to a proton exchange membrane electrochemical cell employing hydrogen, oxygen, and water, other types of electrochemical cells and/or electrolytes may be used, including, but not limited to, phosphoric acid and the like. Various reactants can also be used, including, but not limited to, hydrogen bromine, oxygen, air, chlorine, and iodine. Upon the application of different reactants and/or different electrolytes, the flows and reactions are understood to change accordingly, as is commonly understood in relation to that particular type of electrochemical cell.

Figure 1:
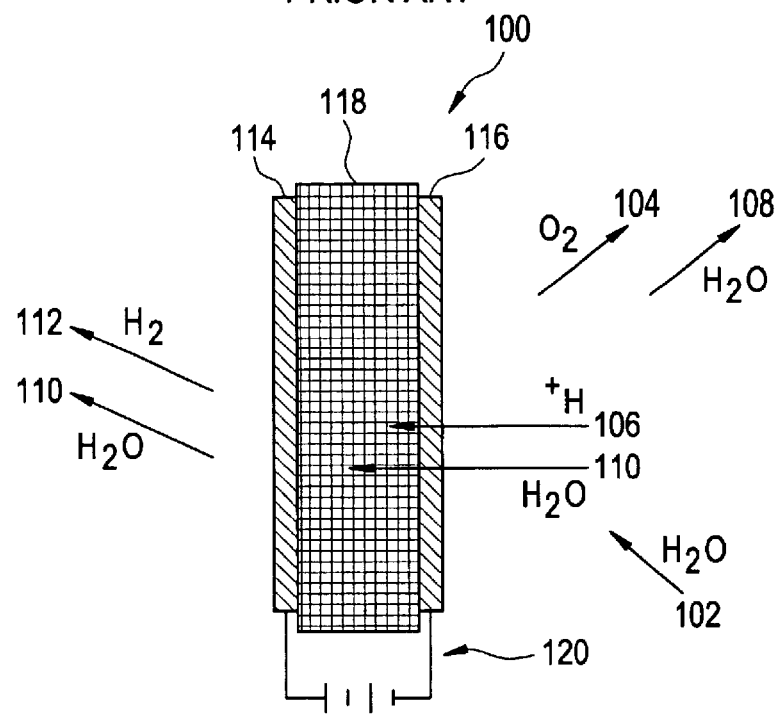
FIG. 1 is a schematic diagram of a partial prior art electrochemical cell showing an electrochemical reaction.
Figure 2:
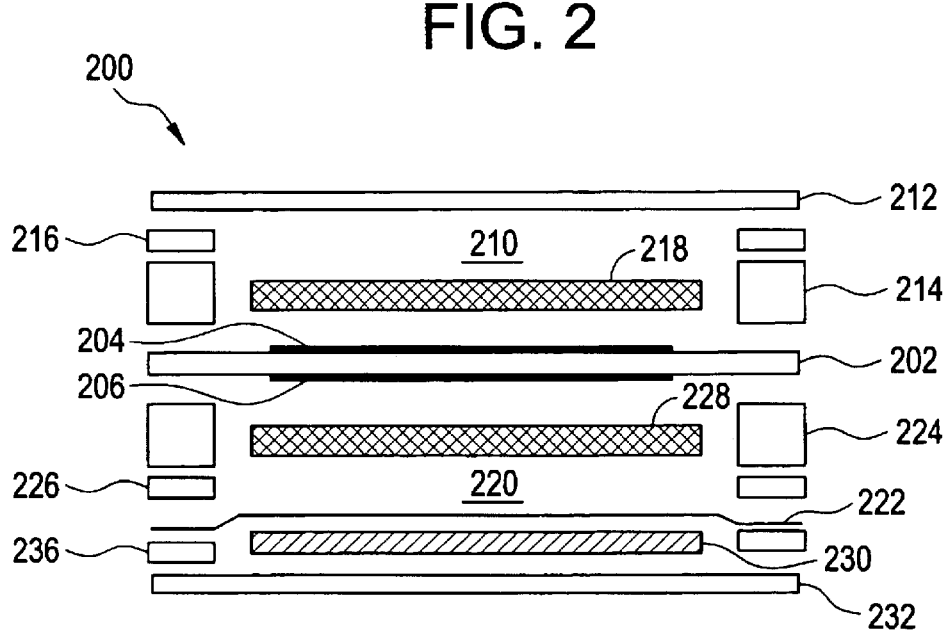
FIG. 2 is an expanded schematic diagram of an electrochemical cell.

Referring to FIG. 2, an electrochemical cell 200 suitable for operation as an anode feed electrolysis cell, cathode feed electrolysis cell, fuel cell, or part of a regenerative fuel cell is schematically shown. Thus, while the discussion below is directed to an anode feed electrolysis cell, cathode feed electrolysis cells, fuel cells, and regenerative fuel cells are also within the scope of the present invention. Cell 200 is typically one of a plurality of cells employed in a cell stack as part of an electrochemical cell system. When cell 200 is used as an electrolysis cell, power inputs are generally between about 1.48 volts and about 3.0 volts, with current densities between about 50 $A/ft^2$ (amperes per square foot) and about 4,000 $A/ft^2$. When used as a fuel cells power outputs range between about 0.4 volts and about 1 volt, and between about 0.1 $A/ft^2$ and about 10,000 $A/ft^2$. The number of cells within the stack, and the dimensions of the individual cells is scalable to the cell power output and/or gas output requirements.

Cell 200 includes a membrane 202 having a first electrode (e.g., an anode) 204 and a second electrode (e.g., a cathode) 206 disposed on opposite sides thereof. Flow fields 210, 220, which are in fluid communication with electrodes 204 and 206, respectively, are defined generally by the regions proximate to, and bounded on at least one side by, each electrode 204 and 206 respectively. A flow field member 228 may be disposed within flow field 220 between electrode 206 and, optionally, a pressure pad separator plate 222. A pressure pad 230 is typically disposed between pressure pad separator plate 222 (which is optional) and a cell separator plate 232. Cell separator plate 232 is disposed adjacent to pressure pad 230. A frame 224, generally surrounding flow field 220 and an optional gasket 226, is disposed between frame 224 and optional pressure pad separator plate 222 generally for enhancing the seal within the reaction chamber defined on one side of cell 200 by frame 224, pressure pad separator plate 222 and electrode 206. Gasket 236 may be disposed between pressure pad separator plate 222 and optional cell separator pad 232 enclosing pressure pad 230.

Another flow field member 218 may be disposed in flow field 210. A frame 214 generally surrounds flow field member 218, a cell separator plate 212 is disposed adjacent flow field member 218 opposite oxygen electrode 204, and a gasket 216 is disposed between frame 214 and cell separator plate 212, generally for enhancing the seal within the reaction chamber defined by frame 214, cell separator plate 212 and the oxygen side of membrane 202. The cell components, particularly cell separator plates 212, 232, frames 214, 224, and gaskets 216, 226, and 236 are formed with the suitable manifolds or other conduits as is conventional.

Membrane 202 comprises electrolytes that are preferably solids or gels under the operating conditions of the electrochemical cell. Useful materials include proton conducting ionomers and ion exchange resins. Useful proton conducting ionomers include complexes comprising an alkali metal salt, alkali earth metal salt, a protonic acid, or a protonic acid salt. Counter-ions useful in the above salts include halogen ion, perchloric ion, thiocyanate ion, trifluoromethane sulfonic ion, borofluoric ion, and the like. Representative examples of such salts include, but are not limited to, lithium fluoride, sodium iodide, lithium iodide, lithium perchlorate, sodium thiocyanate, lithium trifluoromethane sulfonate, lithium borofluoride, lithium hexafluorophosphate, phosphoric acid, sulfuric acid, trifluoromethane sulfonic acid, and the like. The alkali metal salt, alkali earth metal salt, protonic acid, or protonic acid salt is complexed with one or more polar polymers such as a polyether, polyester, or polyimide, or with a network or cross-linked polymer containing the above polar polymer as a segment. Useful polyethers include polyoxyalkylenes, such as polyethylene glycol, polyethylene glycol monoether, and polyethylene glycol diether; copolymers of at least one of these polyethers, such as poly(oxyethylene-co-oxypropylene) glycol, poly(oxyethylene-co-oxypropylene) glycol monoether, and poly(oxyethylene-co-oxypropylene) glycol diether; condensation products of ethylenediamine with the above polyoxyalkylenes; and esters, such as phosphoric acid esters, aliphatic carboxylic acid esters or aromatic carboxylic acid esters of the above polyoxyalkylenes. Copolymers of, e.g., polyethylene glycol with dialkylsiloxanes, maleic anhydride, or polyethylene glycol monoethyl ether with methacrylic acid are known in the art to exhibit sufficient ionic conductivity to be useful.

Ion-exchange resins useful as proton conducting materials include hydrocarbon- and fluorocarbon-type resins. Hydrocarbon-type ion-exchange resins include phenolic resins, condensation resins such as phenol-formaldehyde, polystyrene, styrene-divinyl benzene copolymers, styrene-butadiene copolymers, styrene-divinylbenzene-vinylchloride terpolymers, and the like, that are imbued with cation-exchange ability by sulfonation, or are imbued with anion-exchange ability by chloromethylation followed by conversion to the corresponding quaternary amine.

Fluorocarbon-type ion-exchange resins can include hydrates of tetrafluoroethylene-perfluorosulfonyl ethoxyvinyl ether or tetrafluoroethylene-hydroxylated (perfluoro vinyl ether) copolymers. When oxidation and/or acid resistance is desirable, for instance, at the cathode of a fuel cell, fluorocarbon-type resins having sulfonic, carboxylic and/or phosphoric acid functionality are preferred. Fluorocarbon-type resins typically exhibit excellent resistance to oxidation by halogen, strong acids, and bases. One family of fluorocarbon-type resins having sulfonic acid group functionality is NAFION™ resins (commercially available from E. I. du Pont de Nemours and Company, Wilmington, Del.).

Electrodes 204 and 206 comprise catalyst suitable for performing the needed electrochemical reaction (i.e., electrolyzing water to produce hydrogen and oxygen). Suitable electrodes comprise, but are not limited to, platinum, palladium, rhodium, carbon, gold, tantalum, tungsten, ruthenium, iridium, osmium, alloys thereof, and the like. Electrodes 204 and 206 can be formed on membrane 202, or may be layered adjacent to, but in contact with, membrane 202. Both techniques are known in the art.

Flow field members 218, 228 support membrane 202, allow the passage system fluids, and preferably are electrically conductive, and may be, for example, screen packs or bipolar plates. The screen packs include one or more layers of perforated sheets or a woven mesh formed from metal or strands. These screens typically comprise metals, for example, niobium, zirconium, tantalum, titanium, carbon steel, stainless steel, nickel, cobalt, and alloys thereof. Bipolar plates are commonly porous structures comprising fibrous carbon or fibrous carbon impregnated with polytetrafluoroethylene or PTFE (commercially available under the trade name TEFLON® from E. I. du Pont de Nemours and Company).

The pressure pad provides even compression to the active area of the cell, i.e., the electrodes and any space between two or more electrically associated electrodes of the cell. Maintaining even compression across the active area of the cell pad presents a particular challenge, especially where the differential pressure across the membrane is greater than about 150 psi, 250 psi, 500 psi, 1,000 psi, and especially greater than 2,000 psi.

The inventors hereof have found that use of an electrically conductive, porous, unitary pressure pad consisting essentially of an integral blend of an elastomeric material and electrically conductive particulate material alleviates at least some of the difficulties associated with the prior art. Preferably, the elastomeric materials and the electrically conductive materials are selected so as to be inert in the electrochemical cell environment, in order to prevent degradation of the pad from exposure to the system fluids, and to prevent contamination of the system fluids by the materials.

Suitable elastomeric materials include but are not limited to silicones, such as, for example, fluorosilicones; fluoroelastomers, such as KALREZ® (commercially available from E. I. du Pont de Nemours and Company), VITON® (commercially available from E. I. du Pont de Nemours and Company), and FLUOREL® (commercially available from Minnesota Mining and Manufacturing Company, St. Paul, Minn.); and combinations thereof.

Suitable electrically conductive materials include but are not limited to particulate, conductive metals and alloys and superalloys thereof, for example copper, silver, niobium; zirconium; tantalum; titanium; iron and iron alloys, for examples steels such as stainless steel; nickel and nickel alloys such as HASTELLOY7 (commercially available from Haynes International, Kokomo, Ind.); cobalt and cobalt superalloys such as ELGILOY7 (commercially available from Elgiloy® Limited Partnership, Elgin, Ill.) and MP35N7 (commercially available from Maryland Speciality Wire, Inc., Rye, N.Y.); hafnium, and tungsten, among others; precious metals such as gold, platinum, ruthenium, osmium, rhodium, iridium and palladium; as well as mixtures comprising at least one of the foregoing. Also useful are non-conductive particles coated with conductive materials, for example silver-coated glass spheres. Conductive, particulate carbon may also be used, for example acetylene blacks, conductive furnace blacks (CF), super-conductive furnace blacks (SCF), extra-conductive furnace blacks (XCF), conductive channel blacks (CC), furnace blacks and channel blacks after a heat treatment at a high temperature of about 1500° C., and so on. Various commercial products are available and can be used as such including, for example, Denka Acetylene Black manufactured by Denki Kagaku Kogyo Co., Vulcan C manufactured by Cabot Corp., Continex SCF manufactured by Continental Carbon Co. and Vulcan SC manufactured by Cabot Corp., Vulcan XC-72 manufactured by Cabot Corp., Kohlax L manufactured by DEGUSSA Co. Ketjen Black EC and Ketjen Black EC-600JD manufactured by Ketjen Black International Co. Acetylene blacks in particular have a very low content of impurities and high electroconductivity-imparting power as a consequence of the well-developed secondary structure of the primary particles. Other types of conductive carbon include vapor grown carbon fibers, carbon nanotubes, and the like. Copper, nickel, conductive carbon, or a combination thereof is presently preferred because of the conductivity, availability, low cost, and compatibility with the electrochemical cell environment.

The electrically conductive material is in particulate form. The particles are of a size so as to provide a smooth surface, i.e., be contained within the profile of a pressure pad after manufacture. Suitable particle sizes vary widely, and are readily determined by one of ordinary skill in the art depending on factors including but not limited to the particular materials chosen, the desired elastomeric characteristics and conductivity (conversely, the resistivity) of the pressure pad, the cost of the materials, the size of the pressure pad, the method of manufacture, and other considerations. In general, the average longest dimension of the particle will be less than that of the smallest dimension of the pressure pad. The particular shape of the particles is not critical, and includes spheres, plates, whiskers, short fibers, irregularly shaped particles, and the like.

The pressure pad comprises an integral blend of the above materials, such that the components of the blend are not physically separated under the pressures encountered during operation of the electrochemical cells. Methods for achieving such blends are known in the art, and in include, for example, sintering and/or pressing suitable quantities of electrically conductive particulate material and elastomeric particulate material to form a sheet. When these methods are used, the relative size of the electrically conductive material and the elastomeric particles may be roughly equal. A suitable maximum average particle dimension may be, for example, about 0.01 to about 2, preferably about 0.1 to about 1, more preferably about 0.1 to about 0.5 inches.

Alternatively, known methods for adding particulate, electrically conductive filler materials to resins may also be used, wherein the polymeric resin along with the conductive components and any additional additives are compounded in any commercially available production device such as, for example, an extruder, roll mill, dough mixer, and the like. The polymeric resin may be initially in the form of powder, strands, or pellets and may be pre-compounded with the conductive particles in a Henschel mixer or other type of mixer capable of imparting shear to the mixture so as to bring the components into intimate contact. The pre-compounded mixture may then be extruded at a suitable temperature into a strand that is quenched and pelletized. Alternately, the polymeric resin may be directly added to the extruder with electrically conductive particulates being added either concurrently or sequentially into the extruder to form the conductive strand. Extruder temperature is generally sufficient to cause the polymeric resin to flow so that proper dispersion and wetting of the conductive particles may be achieved. The conductive pellets formed as a result of extrusion (or conductive sheets obtained from a roll mill)

are then subjected to a finishing or forming process such as injection molding, blow molding, vacuum forming and the like to form a usable conductive article. An alternative process comprises dissolving the elastomeric resin in a solvent, adding the particulate, electrically conductive material, and mixing, followed by casting or molding, and the like. When these methods are used, the maximum average particle dimension may be much smaller, as in known in the art. A suitable maximum average particle dimension may be, for example, about 10 nanometers to about 100 millimeters, preferably about 1 micrometer to about 1 millimeter. The conductive fillers may exist in the form of drawn wires, tubes, nanotubes, flakes, laminates, platelets, ellipsoids, discs, and other commercially available geometries. Regardless of the exact size, shape and composition of the conductive fillers particles, they should be thoroughly dispersed through the polymeric resin at loadings greater than or equal to about 1 wt %, preferably greater than or equal to about 1.5 wt % and more preferably greater than or equal to about 2 wt % based on the total weight of the composition. The loadings of said solid metallic and non-metallic conductive fillers particles should be less than or equal to 50 wt %, preferably less than or equal to about 45 wt %, more preferably less than or equal to about 40 wt %. Such compositions and their method of manufacture have been described, for example, in U.S. Patent Nos. 4,011,360; 5,082,596; 5,296,570; 5,498,644; 5,585,038; and 5,656,690. A number of integral mixtures of this type are commercially available from vendors such as the Stockwell Rubber Company or Performance Polymer Technologies, and include, for example, a solid silicone elastomer containing a mixture of particulate nickel and carbon available from Parker Chomerics under the designation S6305, a solid silicone elastomer containing particulate silver-coated alumina available from Parker Chomerics under the designation 1285, a solid silicone elastomer containing particulate, silver-coated glass available from Parker Chomerics under the designation 1285, a solid silicone elastomer containing a mixture of silver and nickel available from Parker Chomerics under the designation 1215, and a silver-coated glass available from Parker Chomerics under the designation 1350.

As mentioned above, the type, size, shape, and quantities of the components of the integral blend are selected so as to provide optimal resilience to the pressure pad that allows a highly predictable and substantially uniform spring rate to be realized, thereby allowing for substantially uniform compression of the cell system components under pressure. The type, size, shape, and quantities of the components of the integral blend are further selected so as to provide optimal conductivity (obversely, resistivity) to the pressure pad. Optimal resistivity will depend upon factors such as the reactants, cell size, operating parameters such as pressure, and the like, in general, the pressure pads will have a volume resistivity of less than about 5.0, preferably less than about 1.0, more preferably less than about 0.1, and most preferably less than about 0.01 Ohm-cm as measured by MIL-G-83528 para. 4.6.11. The preferred range is about $1 \times 10^{-5}$ to about $1 \times 10^{-1}$, preferably to about $1 \times 10^{-2}$.

Figure 3:
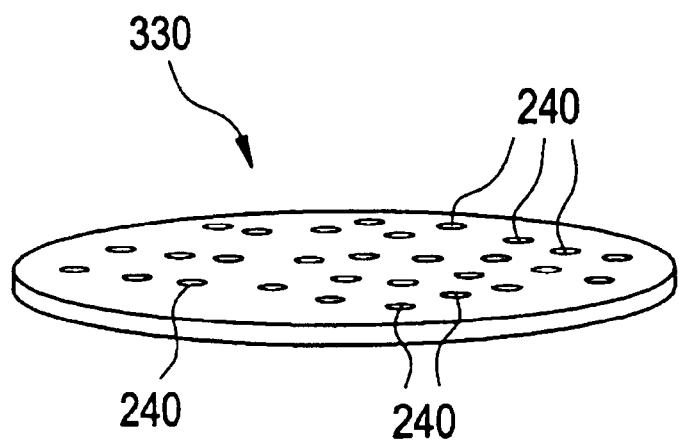
FIG. 3 is a schematic diagram of an exemplary unitary, porous, conductive pressure pad.

The integral blend is furthermore provided in the form a unitary sheet. As used herein, "unitary" means a single sheet wherein the outer surface disposed adjacent to an active area of the electrochemical cell is smooth as shown in FIG. 3. The phrase "a unitary sheet" is thus intended to exclude constructions where, for example, elastomeric fibers are interwoven with electrically conductive fibers, or where elastomers are molded into the depressions of a stamped metal sheet.

The geometry and dimensions of the pressure pads will depend on the geometry, dimensions, and operating pressures of the cell, and similar considerations. Preferably, a pressure pad accordingly has a geometry and area suitable to exert pressure toward the active area. For example, circular pressure pads are suitable for certain electrochemical cells that have a generally circular section with a diameter less than about 0.1 inches (mm) and up to greater than 10 feet (3.048 meters). In general, a thickness of about 0.0005 to about 6 inches (about 0.0127 to about 152.4 millimeters (mm)), preferably about 0.005 to about 1 inch (about 0.127 to about 25.4 mm) for cells having cross sectional areas of about 0.01 to about 10 square feet (about 0.00093 to about 0.93 square meters) are useful. square meters) are useful. Of course, dimensions and geometry of the electrochemical cell may vary depending on factors including but not limited to spatial availability and power requirements.

The pressure pad further has a void volume to allow compression under pressure. In one embodiment of pressure pad 330 shown in FIG. 3, the void volume is provided by pores 240 extending through the thickness of pressure pad 330. The degree of void volume will vary depending on the cell operating conditions, and may be readily determined by one of ordinary skill in the art without undue experimentation. In general, in order allow effective compressibility a void volume of greater than or equal to about 0.1, 10, or 30 percent void volume based on the total volume of the pressure pad is effective. The void volume typically comprises less than or equal to about 90, 85, or in some cases 50 percent based on the total volume of the pressure pad. Where the pressure pad is designed to allow the passage of fluid, the pressure pad generally has a greater void volume, typically about 10 to about 90 percent, and preferably about 20 to about 80 percent void volume based on the total volume of the pressure pad.

Figure 4:
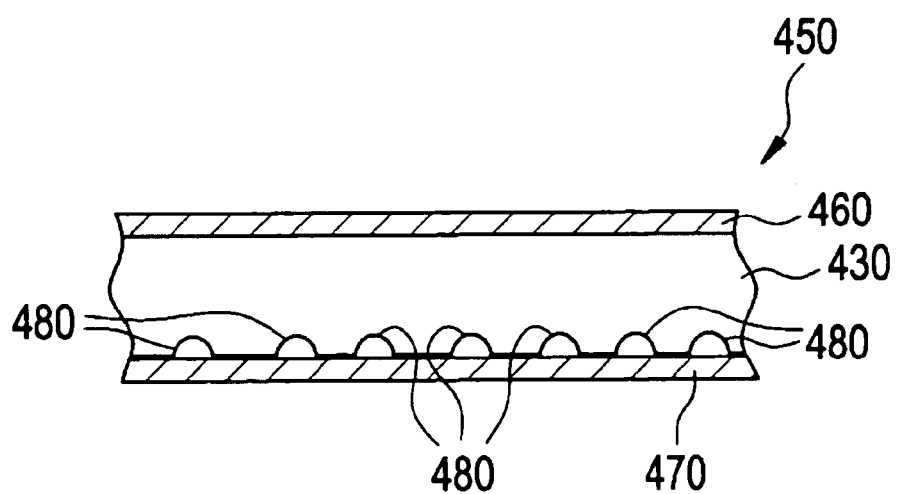
FIG. 4 is a schematic diagram of an exemplary pressure pad system comprising a unitary pressure pad.

The electrically conductive, unitary pressure pad may be used alone, or as part of a pressure pad system 450. In an exemplary system shown in FIG. 4, unitary, electrically conductive pressure pad 430 is disposed adjacent to one or more conductive layers 460, 470 for example, one or more copper foils. The void volume in this embodiment may be provided by pores, or by voids 480 as shown. Voids 480 may have any suitable profile, including but not limited to hemispheres, diamonds, channels, irregular shapes, and the like.

Figure 6:
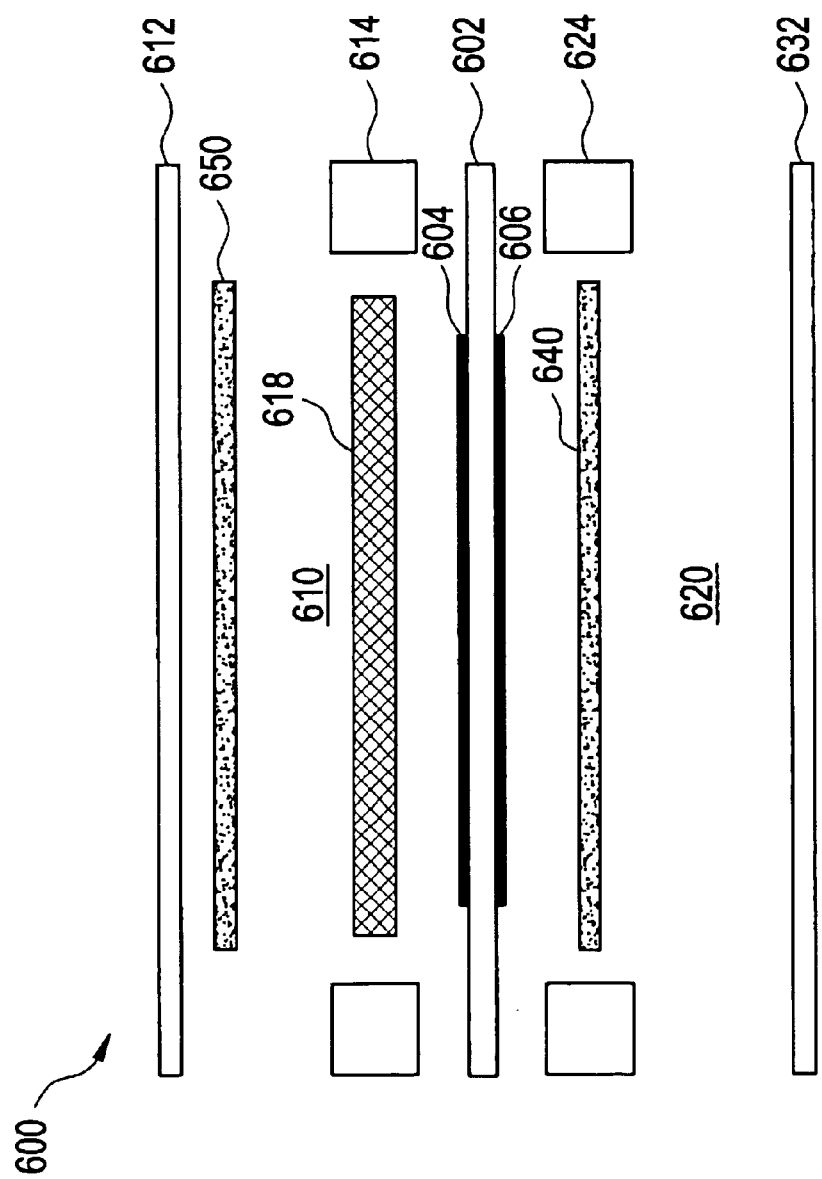
FIG. 6 is a schematic diagram of an embodiment of an electrochemical cell showing pressure pads and their respective locations.

Referring now to FIG. 6, a schematic of a cell 600 having an embodiment of the pressure pad is shown. Cell 600 includes a first electrode 604 and a second electrode 606 disposed in intimate contact with a membrane 602 enclosed in a chamber defined by cell separator plates 612, 632 and frames 614, 624. Cell 600 further includes a member 618 in a flow field 610 adjacent to first electrode 604 opposite membrane 602 and a pressure pad 640 in a flow field 620 between second electrode 606 and cell separator plate 632. A pressure pad 650 is at least in partial fluid communication with member 618, and is disposed between member 618, and cell separator plate 612. Pressure pads 640 and 650 are of similar material and configuration as pressure pad 330 described above with respect to FIG. 3. In this configuration, pressure pad 640 serves not only as the means for ensuring the positive contact of the cell components but also as the primary means of membrane support.

Cell 600 may be an anode feed electrolysis cell, a cathode feed electrolysis cell, or a fuel cell. With the aid of pressure pad 640, electrical contact between second electrode 606 and cell separator plate 632 is maintained. Further, with the aid of pressure pad 650, electrical contact between the first electrode 604 and membrane 618 one side of pressure pad 650, and cell separator plate 612 on the other side of pressure pad 650, is maintained.

In addition to the above preferred embodiment, alternative embodiments are also described, wherein similar elements are described with reference to FIG. 6.

In one embodiment, instead of the combination of a member 618 and a pressure pad 640, a pressure pad can be provided at least in partial fluid communication with the second electrode 606 on one side of the pressure pad 640 and the cell separator plate 612 on the other side of the pressure pad. In this configuration, the pressure pad serves as the means for ensuring the positive contact of the cell components and as the primary means of membrane support.

In another embodiment, a member 618 in a flow field 610 adjacent to first electrode 604 opposite membrane 602 and a second member in a flow field 620 between second electrode 606 and cell separator plate 632. A pressure pad 640 is at least partially in fluid communication with member 618 and is disposed between member 618 and cell separator plate 612. With the aid of pressure pad 640, electrical contact between first electrode 604 and member 618 on one side of pressure pad 640, a cell separator plate 632 on the other side of pressure pad 640 is maintained.

In yet another embodiment, a pressure pad 640 is provided at least in partial fluid communication with first electrode 604 and all separator plate 612. Pressure pad 640 is surrounded by frame 614. In this configuration, pressure pad 640 serves not only as the means for ensuring the positive contact of the cell components, but also as the primary means of membrane support.

In another embodiment, a first pressure pad 640 is in at least partial fluid communication with member 618 and disposed between member 618 and cell separator plate 612, and a second pressure pad 650 is at least in partial fluid communication with a second member and is disposed between the second member and cell separator plate 632. With the aid of pressure pad 640, electrical contact between the first electrode 604 and member 618 on one side of pressure pad 640, and cell separator plate 612 on the other side of pressure pad 640, is maintained. Likewise, with the aid of pressure pad 650, electrical contact between second electrode 606 and the second member on one side of pressure pad 650, and cell separator plate 632 on the other side of pressure pad 650 is maintained.

In yet another embodiment, cell 600 includes a pressure pad 640 within a flow field 620 between second electrode 606 and cell separator plate 632, and a pressure pad positive contact of the cell components, but also as the primary means of membrane support.

In a further embodiment, the cell 600 includes a member 618 in a flow field 620 adjacent to second electrode 606 opposite membrane 602 and a pressure pad 640 at least in partial fluid communication with member 618. Additionally, a pressure pad 650 is at least in partial fluid communication with first electrode 604 and is disposed between first electrode 604 and cell separator plate 612. In this configuration, pressure pad 650 serves not only as the means for ensuring the positive contact of the cell components, but also as the primary means of membrane support.

The pressure pad and pressure pad system each is capable of withstanding pressures up to or exceeding about 150 psi, preferably about 500 psi, more preferably about 1,000 psi, more preferably about 2,000 psi, or even more preferably about 10,000 psi. The pressure pads can thus be introduced into a high pressure electrochemical cell environment.

The invention is further illustrated by the following non-limiting examples, wherein pressure pad compositions and configurations are detailed.

EXAMPLES

Example 1

Pressure pad 340 is formed of a mixture of 50 wt. % VITON® and 50 wt. % niobium. The VITON® is in the form of cut up pieces of a 75 durometer ring having a diameter of about 0.05 inches (about 1.27 mm) and lengths of about 0.25 inches (about 6.35 mm). The niobium is in the form of cut up pieces having a minimum dimension of about 0.05 inches (about 1.27 mm) and a maximum dimension of about 0.25 inches 6.35 mm). The niobium is in the form of cut up pieces having a minimum dimension of about 0.05 inches (about 1.27 mm) and a maximum dimension of about 0.25 inches (about 6.35 mm). The VITON® and niobium were mixed thoroughly and placed on a suitable sintering fixture. The fixture was then heated at 750° F. The sintered plate comprises an integrated mixture of VITON® and niobium having a thickness of about 0.25 inches (about 6.35 mm), and is generally brittle, being suitable for use in a system having operating pressures between ambient pressure and up to about 10,000 psi.

Example 2

Pressure pad 340 is formed of a mixture of 50 wt. % VITON® and 50 wt. % niobium. The VITON® is in the form of cut up pieces of a 50 gauge cord having a diameter of about 0.125 inches (about 3.175 mm) and lengths of about 0.25 inches (about 6.35 mm)]. The niobium is in the form of cut up pieces having a minimum dimension of about 0.125 inches (about 3.175 mm) and a maximum dimension of about 0.25 inches (about 6.35 mm). The VITON® and niobium were mixed thoroughly and placed on a suitable sintering and pressing fixture having a diameter of about 1 inch (2.54 centimeters). The fixture was subjected to a pressure of 2000 psi and a temperature of 400° F. The sintered plate comprises an integrated mixture of VITON® and niobium having a thickness of about 0.25 inches (about 6.35 mm), and suitable for use in a system having operating pressures between ambient pressure and up to about 10,000 psi.

Example 3

Pressure pad 340 is formed of a mixture of 50 wt.% VITON® and 50 wt.% niobium. The VITON® is in the form of cut up pieces of a 50 gauge cord having a diameter of about 0.125 inches (about 3.175 mm) and lengths of about 0.25 inches (about 6.35 mm)]. The niobium is in the form of cut up pieces having a minimum dimension of about 0.125 inches (about 3.175 mm) and a maximum dimension of about 0.25 inches (about 6.35 mm). The VITON® and niobium were mixed thoroughly and placed on a suitable sintering and pressing fixture having a diameter of about 5 inches (12.7 centimeters). The fixture was subjected to a pressure of 2000 psi and a temperature of 400° F. for 20 minutes wherein the temperature ramping was allowed to overshoot by 2.5° F. for a period of 10 minutes. The sintered plate comprises an integrated mixture of VITON® and niobium having a thickness of about 0.25 inches (about 6.35 mm), and suitable for use in a system having operating pressures between ambient pressure and up to about 10,000 psi.

Example 4

Figure 5:
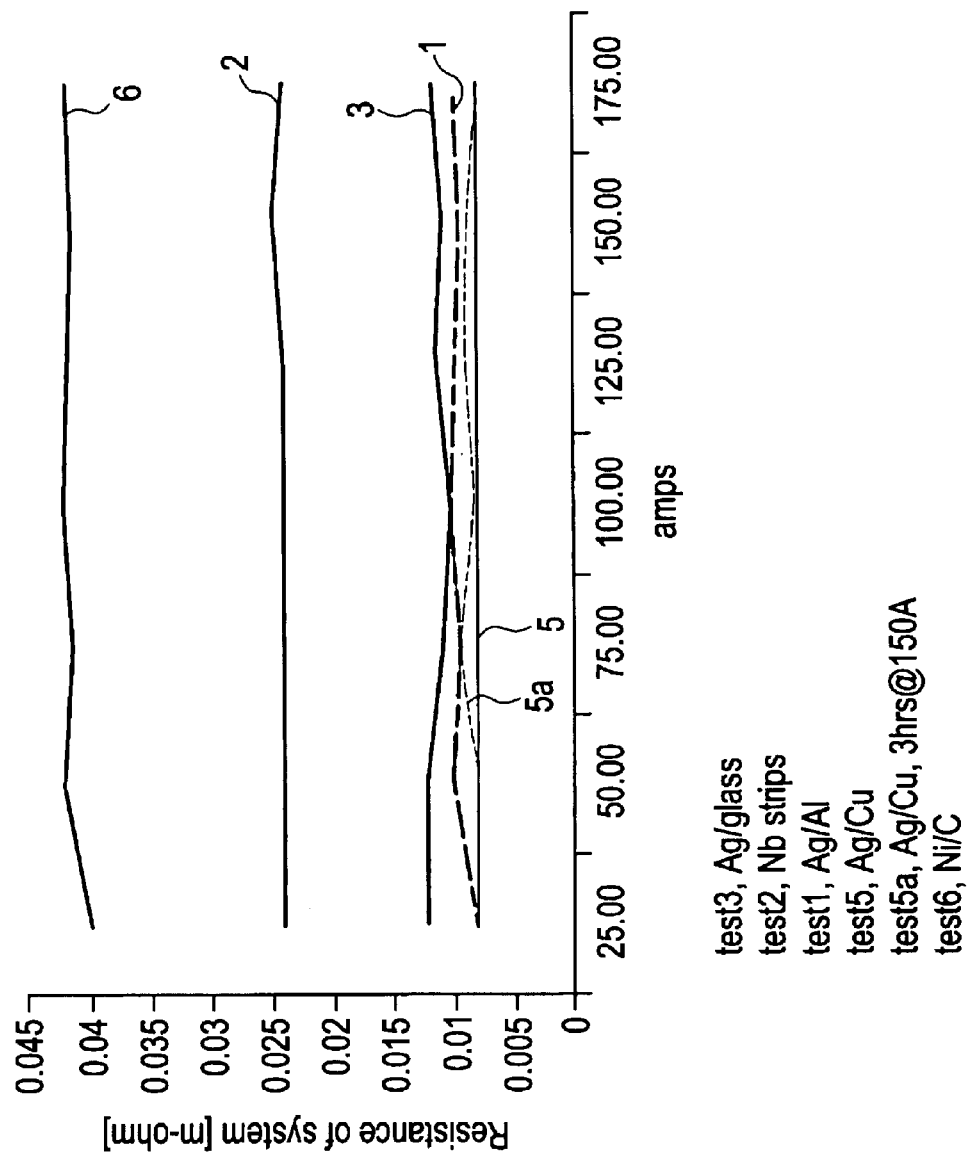
FIG. 5 is a graph illustrating Resistance vs. Amps for various pressure pads.

A number of unitary pressure pads were tested as follows: a silicone pressure pad comprising small carbon and nickel fibers (4.25 inch diameter, 0.33 inches (0.81 mm thick)) having a void volume of 48.2% was placed in a test device and subjected to a load of 35 inch-pounds, and a current of 25–2000 Amps was passed through the pad. Resistivity was calculated from the current and voltage. Results of the comparative tests are shown in FIG. 5. As can be seen from these results, elastomeric pressure pads comprising particulate Ni/C, Ag/Cu, Ag/glass, and Ag/Al fillers (Tests 6, 1, 5, 5a, and 3) demonstrated low resistivities over a range of current densities from: 25 to 175 Amps. Comparative test 2 is a prior art pressure pad using niobium strips threaded through an elastomeric pressure pad). While this pad also has low resistivities, the niobium is not integral to the pad and the pad does not have a smooth surface.

The electrochemical cell describe herein utilizes pressure pads formed of metals compatible with system fluids and the membrane. The pressure pads are capable of withstanding pressures exceeding 2,500 psi, and even exceeding 10,000 psi, with the upper pressure limit controlled by the system capabilities. Further, when properly configured, the pressure pads have spring rates that are readily predictable and uniform. An electrically conductive material and a relative quantity thereof can be selected and the pressure pad configured such that the overall electrical resistance is low, thereby lowering the overall stack resistance. Additionally, the pressure pad can be manufactured at a low cost because it can be readily sintered and/or pressed as a single component, and assembly and preparation of the electrochemical cells are simplified. Finally, due to the fewer number of parts, an electrochemical cell using such pads is lower in cost and has a higher reliability.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An electrochemical cell, comprising:
   a first electrode;
   a second electrode;
   a membrane disposed between and in intimate contact with said first electrode and said second electrode;
   a first flow field in fluid communication with said first electrode opposite said membrane;
   a second flow field in fluid communication with second electrode opposite said membrane; and
   a unitary, porous, electrically conductive pressure pad adjacent said first flow field and said first electrode, wherein said pressure pad comprises an integral mixture of particulate, electrically conductive material and elastomeric material.

2. The electrochemical cell of claim 1, wherein said elastomeric material is particulate.

3. The electrochemical cell of claim 1, wherein said pressure pad has a void volume of about 0.1% to about 90% based on the total volume of the pressure pad.

4. The electrochemical cell of claim 1, wherein said pressure pad has a void volume of about 10% to about 80% based on the total volume of the pressure pad.

5. The electrochemical cell of claim 1, wherein said electrically conductive material is inert to fluids within the electrochemical cell.

6. The electrochemical cell of claim 1, wherein said electrically conductive material is selected from the group consisting of copper, silver, niobium, zirconium, tantalum, titanium, steels, nickel, cobalt, carbon, precious metals, and alloys, mixtures, and superalloys comprising at least one of the foregoing electrically conductive materials.

7. The electrochemical cell of claim 1, wherein said elastomeric material is selected from the group consisting of silicones, fluorosilicones, fluoroelastomers, and mixtures comprising at least one of the foregoing polymeric materials.

8. The electrochemical cell of claim 1, further comprising a conductive foil in electrical communication with said pressure pad.

9. The electrochemical cell of claim 1, wherein said pressure pad is in fluid communication with said first flow field.

10. The electrochemical cell of claim 1, wherein said electrically conductive material comprises gold.

11. The electrochemical cell of claim 1, further comprising a second electrically conductive pressure pad adjacent to said second flow field and said second electrode.

12. The electrochemical cell of claim 11, wherein said second electrically conductive pressure pad is in fluid communication with said second flow field.

13. The electrochemical cell of claim 11, wherein said electrically conductive first pressure pad and said electrically conductive second pressure pad are of a similar material and configuration.

* * * * *